(12) United States Patent
Cvek (10) Patent No.: US 9,552,602 B2
(45) Date of Patent: Jan. 24, 2017

(54) PRODUCT IDENTIFICATION SYSTEM AND METHOD

(71) Applicant: Sava Cvek, Jamaica Plain, MA (US)

(72) Inventor: Sava Cvek, Jamaica Plain, MA (US)

(*) Notice: Subject to any disclaimer, the term of this patent is extended or adjusted under 35 U.S.C. 154(b) by 869 days.

(21) Appl. No.: 13/864,230

(22) Filed: Apr. 16, 2013

(65) Prior Publication Data

US 2013/0275267 A1    Oct. 17, 2013

Related U.S. Application Data

(63) Continuation-in-part of application No. 13/459,076, filed on Apr. 27, 2012, now abandoned, and a continuation-in-part of application No. 13/023,540, filed on Feb. 8, 2011, and a continuation-in-part of application No. 13/016,958, filed on Jan. 28, 2011.

(60) Provisional application No. 61/479,399, filed on Apr. 27, 2011, provisional application No. 61/302,284, filed on Feb. 8, 2010, provisional application No. 61/298,961, filed on Jan. 28, 2010, provisional application No. 61/625,074, filed on Apr. 16, 2012.

(51) Int. Cl.
*G06Q 30/00* (2012.01)
*G06Q 30/06* (2012.01)
*A47C 31/12* (2006.01)

(52) U.S. Cl.
CPC ......... *G06Q 30/0623* (2013.01); *A47C 31/126* (2013.01); *G06Q 30/00* (2013.01)

(58) Field of Classification Search
CPC .... G06Q 30/00; G06Q 30/06; G06Q 30/0623; A47C 31/126
See application file for complete search history.

(56) References Cited

U.S. PATENT DOCUMENTS

| | | | | |
|---|---|---|---|---|
| 5,060,174 A | * | 10/1991 | Gross | A47C 31/126 702/139 |
| 5,176,424 A | * | 1/1993 | Tobita | A47C 27/082 177/208 |
| 5,642,302 A | * | 6/1997 | Dumont | B60N 2/0232 128/845 |
| 5,930,152 A | * | 7/1999 | Dumont | B60N 2/0224 128/845 |

(Continued)

OTHER PUBLICATIONS

I. Daian et al. "Sensitive Chair: A Force Sensing Chair with Multimodal Real-Time Feedback via Agent" Proceedings of the ECCE 2007 Conference, Aug. 28-31, 2007, London, UK.*

*Primary Examiner* — Naeem Haq
(74) *Attorney, Agent, or Firm* — Thomas P. O'Connell; O'Connell Law Firm (57) ABSTRACT

A product information communication system comprising a product, a product identification device retained relative to the product, product identifying information retained in electronic memory regarding the product, and a communication network permitting electronic access to the product details including the retained product identifying information. Identifying information can be accessed by wireless communication and rendered available by a central server with electronic access to product identifying information. Product details can include product characteristics, functions, construction, maintenance, performance, usage, warranty information, and instructions. Electronic tracking, analysis, and recommendation regarding product usage by sensors can be selectively induced.

17 Claims, 5 Drawing Sheets

(56) References Cited

U.S. PATENT DOCUMENTS

| | | | | |
|---|---|---|---|---|
| 6,669,286 B2* | 12/2003 | Iusim | ............... | A47C 31/126 297/217.4 |
| 7,666,151 B2* | 2/2010 | Sullivan | ............... | A61B 5/11 340/573.1 |
| 8,296,408 B2* | 10/2012 | Anke | ............... | G06F 9/5044 340/500 |
| 9,351,890 B2* | 5/2016 | Hough | ............... | A61G 5/14 |
| 2002/0065470 A1* | 5/2002 | Cassaday | ............... | A47C 1/022 600/485 |
| 2002/0082952 A1 | 6/2002 | Johnston | | |
| 2002/0184114 A1 | 12/2002 | Jorgensen | | |
| 2005/0015312 A1 | 1/2005 | Hoffman et al. | | |
| 2009/0216682 A1 | 8/2009 | Foladare et al. | | |
| 2010/0198374 A1 | 8/2010 | Carson et al. | | |
| 2011/0218880 A1* | 9/2011 | Hammad | ............... | G06Q 20/32 705/26.41 |
| 2012/0277637 A1* | 11/2012 | Vahdatpour | ............... | A47C 31/123 600/595 |
| 2014/0265502 A1* | 9/2014 | Hough | ............... | A61G 5/14 297/344.12 |
| 2015/0209207 A1* | 7/2015 | Cooper | ............... | A61G 5/1056 701/49 |
| 2016/0067123 A1* | 3/2016 | Arzanpour | ............... | A61G 5/10 701/46 |

* cited by examiner

PRODUCT IDENTIFICATION SYSTEM AND METHOD

RELATED APPLICATIONS

This application claims priority from Provisional Application No. 61/625,074 filed on Apr. 16, 2012 and is a continuation-in-part of application Ser. No. 13/459,076, filed Apr. 27, 2012. Application Ser. No. 13/459,076 claims priority from Provisional Application No. 61/479,399 filed on Apr. 27, 2011 and is a continuation-in-part of application Ser. No. 13/023,540 filed on Feb. 8, 2011 and a continuation-in-part of application Ser. No. 13/016,958 filed on Jan. 28, 2011, which applications claimed priority to Provisional Application 61/302,284 filed on Feb. 8, 2010 and to Provisional Application No. 61/298,961 filed on Jan. 28, 2010. Each of these applications is incorporated herein by reference.

FIELD OF THE INVENTION

The present invention relates generally to information systems and methods. More particularly, disclosed herein are a system and method for producing a product network with information communication via website or other electronic access regarding generalized and individualized product details, including product characteristics, functions, construction, maintenance, performance, usage, warranty, instructions, and further product details.

BACKGROUND OF THE INVENTION

Under the prior art, a user or prospective consumer of a product has been extremely limited in the type of information that could be obtained regarding a product from merely observing the product itself. A person can observe the general type of the product and its overall construction and condition. However, a detailed understanding of additional product details, such as particularities in the construction, maintenance, or repair of the product or the preferred usage practices or usage history of the product, cannot be obtained merely from observing the product itself. Even for a product already owned by a user, detailed product information may be unavailable as being lost from memory or due to a loss of relevant informational materials.

Moreover, users and prospective consumers have been quite limited in the manner that information beyond the mere physical appearance of the product can be obtained. For instance, a user already possessed of a given product must either attempt to maintain product purchase and usage history and other details in memory, or the user must attempt to maintain records of the same. Understandably, therefore, most users find themselves without much product information readily at hand. Users and prospective consumers can additionally seek to obtain product details from a sales representative or a product manufacturer, but obtaining information in that manner can be exceedingly challenging, time consuming, and frustrating.

These problems have existed for time immemorial. With a knowledge of these and further deficiencies in the prior art, the present inventor has appreciated that there is and has been a need for a system and method that would permit users, prospective purchasers, and others to obtain details regarding products in an efficient and convenient manner by permitting a product itself to act as a conduit to and a provider of what effectively comprises a product identity formed by infinitely variable details, including the product purchase history, use, construction, maintenance, repair, and other details.

SUMMARY OF THE INVENTION

Accordingly, the present inventor set forth with the basic object of providing a system and method for permitting a product itself to act as a conduit to and a provider of a product identity comprising product details.

A more particular object of embodiments of the invention is to provide a system and method for enabling access to product purchase history, use, construction, maintenance, repair, and other product details in an efficient and convenient manner.

A further object of embodiments of the invention is to retain product history details and to permit access thereto automatically or selectively by a user through a computing device.

These and in all likelihood further objects and advantages of the present invention will become obvious not only to one who reviews the present specification and drawings but also to those who have an opportunity to experience use of an embodiment of the product identification system and method disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The product identification system and method disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

Figure 1:
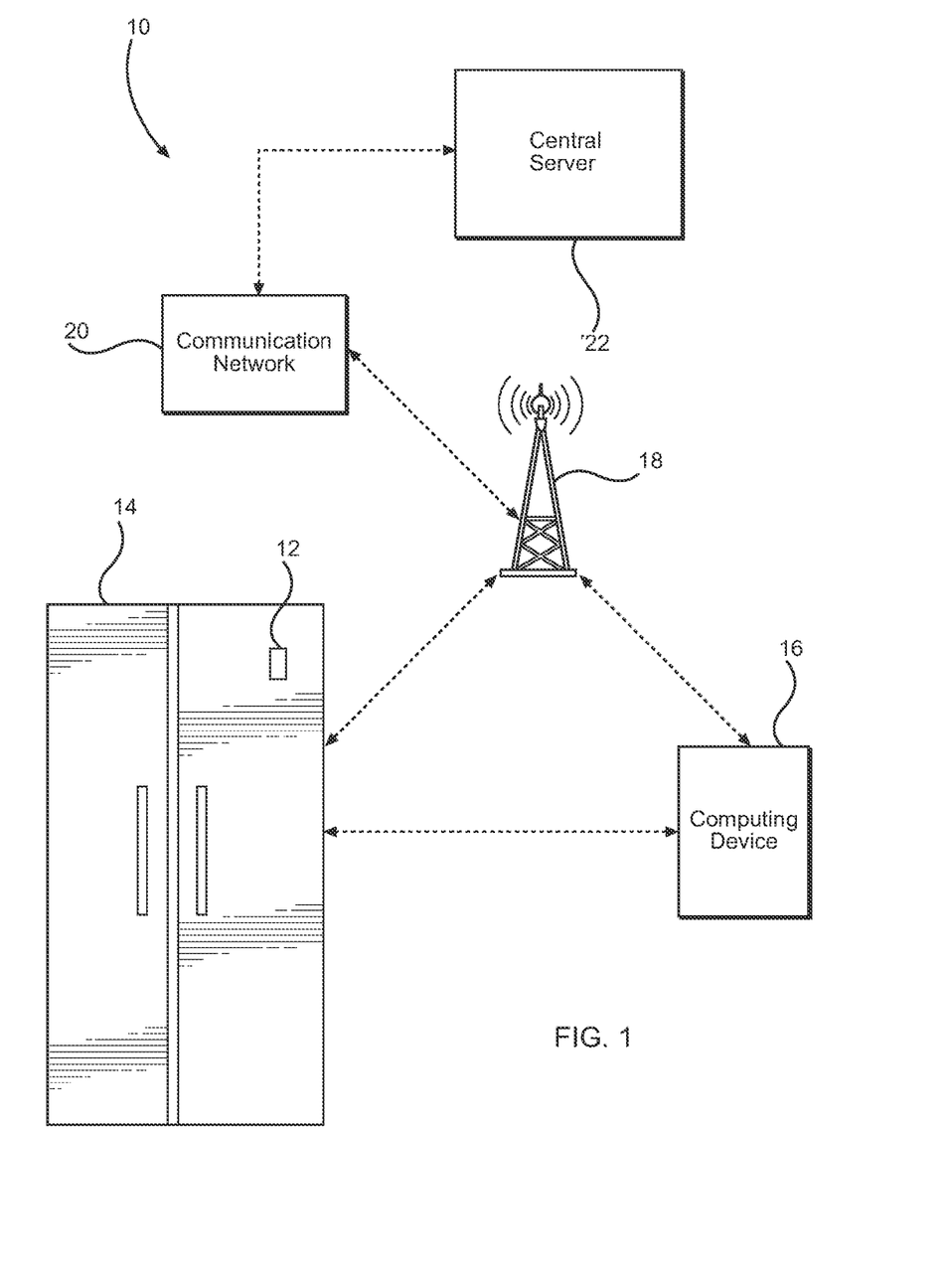
FIG. 1 is a schematic view of an embodiment of the product identification system and method disclosed herein.

One potential embodiment of the product identification system is indicated generally at 10 in FIG. 1. There, the system 10 may be considered to be founded on a product identification device 12 that is retained relative to a product 14. Within the scope of the invention, the product 14 can vary infinitely and can include, by way of example and not limitation, furniture products, appliances, vehicles, and any other product about which manufacturers and consumers might wish to have product details rendered available. In the depicted example, the product 14 comprises a refrigerator.

The product identification device 12 incorporates means for retaining identifying information regarding the product 14, such as means for electronically retaining identifying information, and means for permitting access to the retained identifying information. The means for electronically retaining identifying information could, by way of example, comprise an electronic memory chip 15 as seen, for instance, in FIG. 3. The means for permitting access to the retained identifying information by wireless communication may be operable through wireless technology operating under a wireless communication protocol such as the wireless communication protocol established under the registered trademark BLUETOOTH of Bluetooth SIG, Inc. of Kirkland, Wash., USA. Additionally or alternatively, access to the retained identifying information could be provided through a direct or wired connection.

Pursuant to the invention, a user could obtain the product identifying information from the product identification device 12 through a computing device 16. The computing device 16 could take any effective form, including by way of example a smart phone, a desktop computer, a laptop, or any other computing device. The computing device 16 and, potentially, the product identification device 12 can communicate with a central server 22 through a communication network 20 and, if necessary, a communication tower 18 or other access means.

Figure 2:
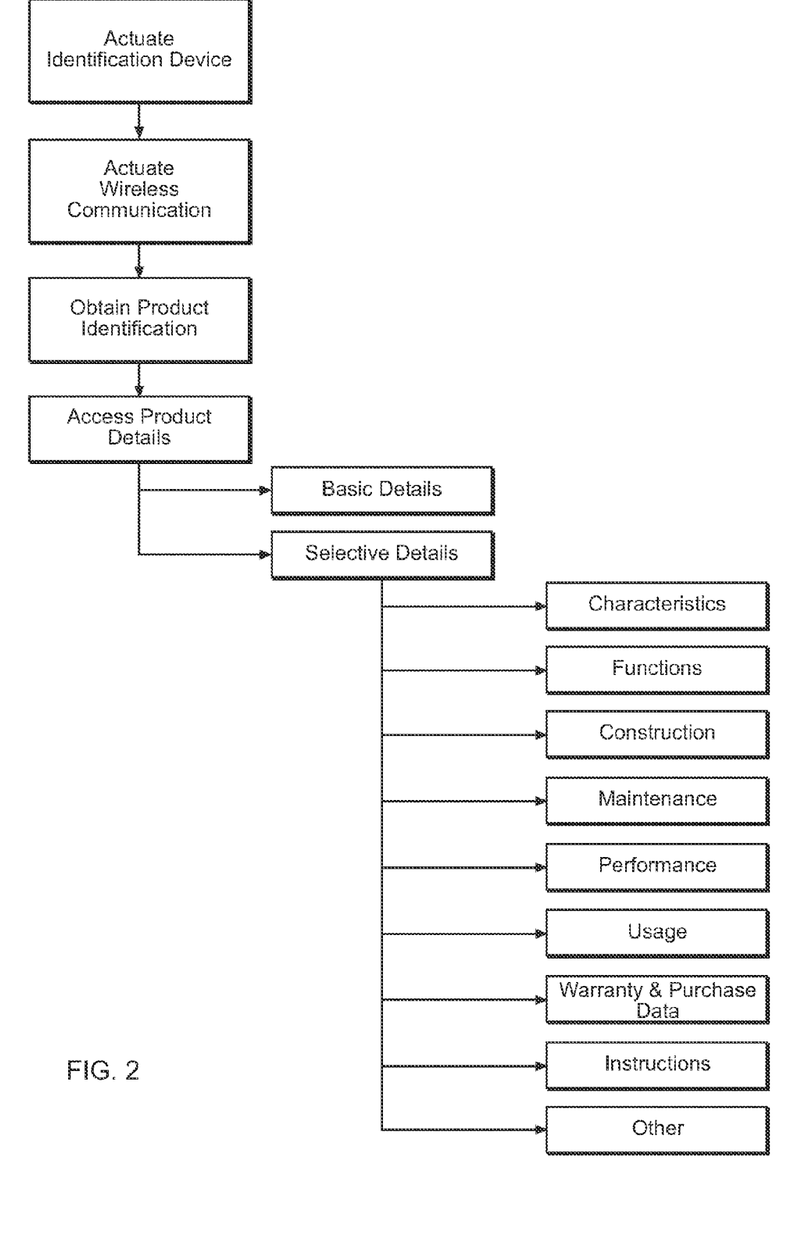
FIG. 2 is a flow chart depicting the use of an embodiment of the product identification system and method pursuant to the invention.

In one manifestation of the invention, as depicted in FIG. 2, a consumer in proximity to a product 14 with a product identification device 12 could have a dedicated computer application, such as an application for a mobile computing device 16, and means for providing wired or wireless communication between the mobile device 16 and the product identification device 12. Where wireless communication is provided, the person can, if necessary, actuate wireless data communication by the product identification device 12. Alternatively, the computing device 16 can be connected directly to the product identification device 12, such as through a data port or other electronic connection. As noted, where wireless data communication is actuated, the computing device 16 can connect via wireless technology, such as the wireless connectivity provided under the trademark BLUETOOTH of Bluetooth SIG, Inc. of Kirkland, Wash., USA, to the product identification device 12 to obtain identification and potentially other data from the product identification device 12 regarding the product 14.

Armed with the product identification data, the consumer can automatically or selectively be brought to a dedicated website or other user interface accessed through the communication network 20. The user interface, which can be displayed on a display screen of the computing device 16, can provide access to further details regarding the product 14, such as through the central server 22.

As shown in FIG. 2, product details can include, by way of example and not limitation, characteristics, functions, construction, maintenance, performance, usage, warranty, instructions, instructional video and audio recordings, live product assistance, and further product details. The details can be generalized product details for all products 14 of the given product type. Additionally or alternatively, individualized product details comprising information specific to the individual given product 14 can be provided, such as the date of purchase, usage data, repair data, maintenance data, and other data.

Through the disclosed system 10 and method, a user could automatically receive, for example, a personalized story regarding the characteristics and history of the product 14. The story could be relayed via text and additionally or alternatively, via spoken words, such as through text-to-speech technology. In one example, the user could automatically receive basic product details, such as product identification and purchase details. Selective access can then be provided to further details, such as information regarding product repair, usage, warranty, and other details. For instance, a blender's basic story could be relayed as 'I am a SuperMix Brand blender. I was purchased in July of 2012, and my warranty expires at the end of July, 2017." Further details could, for instance, be relayed as "I have been used, on average, twice per week for a duration of 10 minutes for each use." Of course, an infinite variety of basic and detailed product details and information access is possible and within the scope of the invention except as it might be expressly limited.

Figure 8:
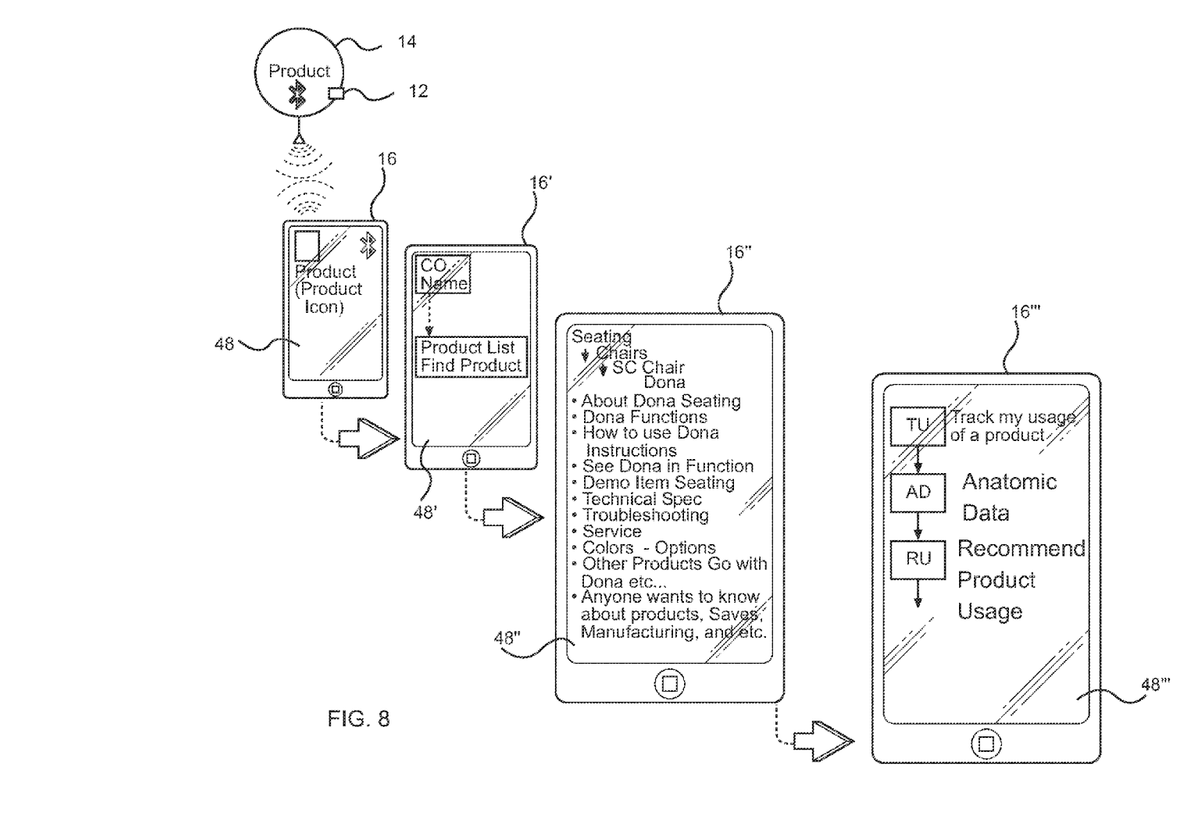
FIG. 8 is a schematic depiction of a mobile device operating pursuant to the invention.

FIG. 8 depicts sequential user interfaces on a computing device 16 pursuant to an embodiment of the invention. There, a product 14, which again can be any type of product 14 about which a user might desire information, again retains a product identification device 12, and the product identification device 12 includes means for relaying product identifying information regarding the product 14 to the computing device 16 as described herein. As shown, display of product identifying information could begin with a first user interface 48, which could simply comprise a program icon, such as an iProduct icon.

Via the product identification program disclosed herein, a user's pressing the program icon could trigger the display of a second user interface 48' on the computing device 16' wherein, for example, an icon with the manufacturer's name and an icon with the product name or a list of product names and, additionally or alternatively, product images to be selected by the user. A user's selection of the product can then trigger a third user interface 48" on the computing device 16" where a list of menu items regarding the product 12 can be displayed. By way of example, the menu items could include the product details described herein. A user's pressing or otherwise selecting one of the menu items can then trigger a user interface 48'" on the computing device 16'" depending on the menu item selected. As in the depicted display, a user could select a usage analysis option, which could trigger a user interface 48'" where further information and analysis regarding usage details can be induced or accessed. As shown, for example, the user could selectively press a first icon to induce a tracking of product usage, a second icon to analyze that data, or a third icon to obtain recommendations regarding product usage, which recommendations could be based on analyzed product usage, user characteristics, or some combination thereof or other factors.

Figure 9:
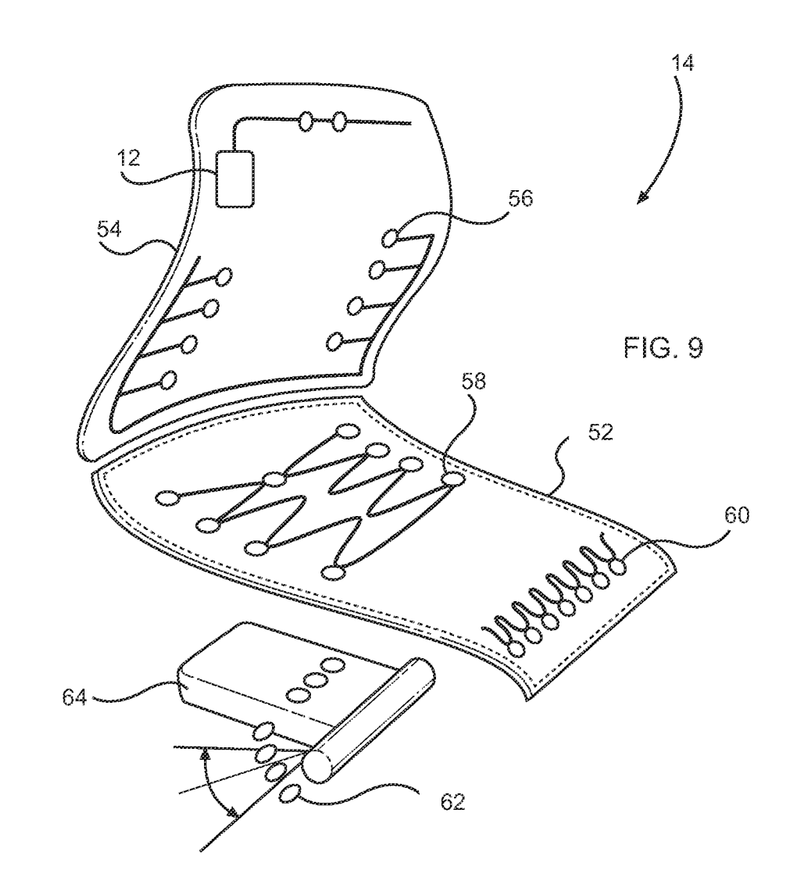
FIG. 9 is a perspective view of a seating product incorporating aspects of the product identification system disclosed herein.

Product usage data could be harvested in numerous ways within the scope of the invention. In certain practices of the product networking and information communication system 10, one or more sensors can be coupled to or otherwise associated with the product 14 to obtain product usage information. As depicted in FIG. 9 where the product 14 takes the form of a chair, such as an office chair, a plurality of sensors 56, in this case lumbar and back sensors 56, can be disposed on the chair back 54 for sensing, among other things, product usage characteristics, in this case the amounts and locations of the forces applied to the chair back 54 by the user. Likewise, a plurality of sensors 58 can be disposed on the central and posterior portions of the seat bottom 52 for sensing the amounts and locations of the forces applied to those portions of the seat bottom 52, and a plurality of sensors 60 can be disposed along an anterior portion of the seat bottom 52 for sensing localized forces. Even further, sensors 62 can be retained relative to the chair support mechanism 64 for sensing, among other things, angular forces applied to the mechanism 64 and the disposition of the seat bottom 52. The sensors 56, 58, 60, and 62 could sense pressure, motion, deflection, or any other usage parameter for the product 14.

Data acquired by the sensors 56, 58, 60, and 62 can be retained by the system 10, whether by the product identification device 12, by the computing device 16, by a central server 22, by some combination thereof, or by some other means. The data can be analyzed to track and determine usage patterns and any deficiencies, improvements, variations, and other characteristics. Moreover, by use of the system 10, guidance regarding, for example, potential improvements in usage can be provided through a computing device 16 or otherwise. The guidance could be provided automatically, such as where a deficiency, proficiency, or some other performance characteristic is sensed, or in response to an inquiry by a user through the computing device 14.

It should be appreciated that the product 14 and the physical dispositions of the sensors 56, 58, 60, and 62 are merely exemplary. The type or types and locations of sensors will vary depending on, among other things, the product 14 at hand and the goals of the manufacturer and user. While the sensors 56, 58, 60, and 62 are shown as being physically located on the product 14, it would be possible within the scope of the invention for sensing to be accomplished remotely, such as by a video analysis of product usage or some other means.

In any event, sensors can be employed to collect product specific data to permit the study and analysis of product usage and performance, including the interaction between the product 14 and the user. Data regarding product usage can thus be followed, collected, analyzed, studied, and leveraged on general and user-specific levels. The data analysis can be performed any component or components of the system 10, including the computing device 16, a central server 22, or some other computing means or by a combination thereof. Manufacturers and designers can gain valuable data and analysis regarding product usage, and users can gain helpful guidance regarding proper or improved product usage particular to the user and to particular usage patterns of the user.

The product identification device 12 could vary within the scope of the invention. Embodiments are contemplated that are self-powered, such as through a rechargeable power source, disposable batteries, such as lithium ion batteries, or any other means for providing power as and if necessary. The product identification device 12 will preferably be operative to communicate data and potentially to be charged under a wireless communication protocol as noted previously, but the product identification device 12 could additionally or alternatively communicate data and potentially be recharged by a direct or wired connections, potentially by periodic connection for recharging and, additionally or alternatively, data exchange or downloading.

Figure 3:
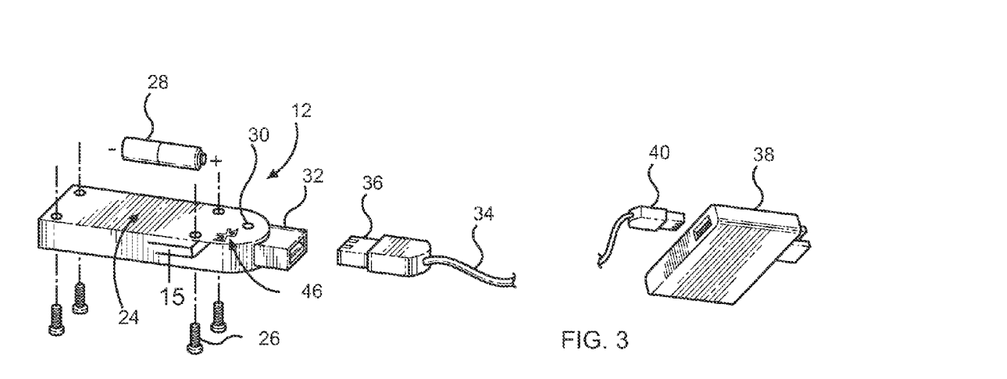
FIG. 3 is a perspective view of a product identification device and power and data transfer arrangement.

One product identification device 12 is shown in FIG. 3. There, the product identification device 12 is founded on a body portion 24 that can be fastened to a product 14. A power source 28, which could be of any type that might now exist or hereafter be developed, is retained by the body portion 24 to provide power to the product identification device 12. One or more indicators 30, such as LEDs or any other effective indicators, can provide an indication of the status of the product identification device 12, such as the charging status, communication status, or any other status. A wireless transmitter 46, such as a transmitter operative under the wireless communication protocol referred to under the registered trademark BLUETOOTH of Bluetooth SIG, Inc. of Kirkland, Wash., USA, is retained by the body portion 24 and is operative to transmit and receive data and commands relative to memory retained by the personalized identification device 12. As FIG. 3 illustrates, the product identification device 12 may incorporate an integrated circuit chip 15 or some other memory device. The product identification device 12 additionally includes an electronic connection port, such as a USB connector 32, for permitting an uploading and downloading of data from memory. Moreover, a USB cable 34 with a first connector 36 at a first end thereof and a second connector 40 at a second end thereof can selectively provide a wired connection between the product identification device 12 and the computing device 16. The product identification device 12 can be rechargeable by direct, wired electrical connection or wirelessly. Where a wired electrical connection is employed, an AC connector 38 can be provided to selectively engage the second connector 40 to permit charging from AC current.

Figure 4:
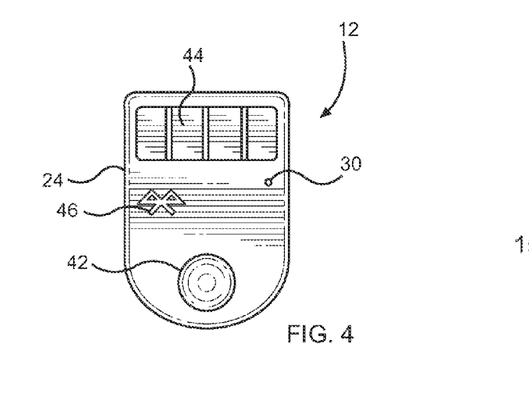
FIG. 4 is a view in front elevation of a product identification device as taught herein.
Figure 5:
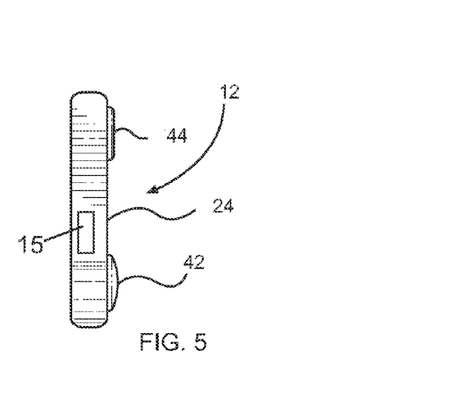
FIG. 5 is a view in side elevation of the product identification device of claim 4.

An alternative product identification device is again indicated generally at 12 in FIGS. 4 and 5. In this embodiment, the product identification device 12 again has a body portion 12. As before, a wireless transmitter 46 permits remote transmission of data relative to the product identification device 12, and one or more indicators 30 can provide an indication of the charging, communication, or other status of the product identification device 12. The power source for the product identification device 12 in the present embodiment can be recharged by one or more photovoltaic cells 44, which can be fixed to the body portion 24.

Access to the product identification application as taught herein, which can be retained in memory 15 on the computing device 16, on a central server 22 for access through a website, or by some combination or variation thereof, could be triggered by selective actuation by the user. For example, as is shown in FIGS. 4 and 5, the personalized identification device 12 can be selectively actuated and de-actuated by a button 42 or other actuation means. Additionally or alternatively, the product identification and information application could be triggered or offered automatically when the computing device 16 is placed in proximity to the product 14 by a wireless proximity actuation, whether by infra-red or some other actuation wireless communication protocol.

Figure 6:
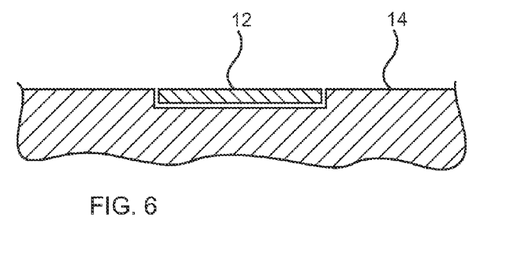
FIG. 6 is a sectioned view in side elevation of a product identification device applied to a horizontal surface of a product according to the invention.
Figure 7:
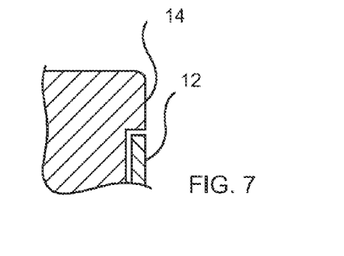
FIG. 7 is a sectioned view in side elevation of a product identification device applied to a vertical surface of a product according to the invention.

The size, shape, mounting method, and other details of the product identification device 12 can vary depending on, among other things, the product 14 at hand and the application thereof. In certain practices of the invention, the product identification device 12 can be incorporated into the product 14 on initial manufacture. In other practices of the invention, the personalized identification device 12 can be secured relative to a previously existing product 14. The personalized identification device 12 can be disposed within the product 14, or it can be coupled to the surface thereof or otherwise retained relative thereto by any effective means. As shown in FIG. 6, the personalized identification device 12 can be embedded in a horizontal surface of a product 14 where appropriate. The personalized identification device 12 can alternatively be embedded in a vertical surface of a product 14 as in FIG. 7 or any other surface or portion of a product 14 as may be preferred.

In view of the foregoing, it will be appreciated that the personalized product identification device or chip 12 and the system 10 in general give personalized character and identity to inanimate products 14. Products 14 bearing the personalized identification device 12 could be referred to as iProducts 14 in that, in cooperation with the overall system 10, they would be capable of providing information regarding the products 14, the user, and the interaction therebetween in a manner heretofore unrealized. The product networking system 10 and method give individual products 14 identities, characterizations of who and what the product 14 is and how it should be used and maintained.

Through a website, computerized application, or other means, the system 10 can refer the user to additional products that could be compatible with the identified product 14 or that would represent improvements thereover, potentially based on product usage data. Moreover, the system 10 can automatically or selectively connect the user to product reviews, blogs regarding the product 14, product usage, and the like, and product histories.

The product network could be administered by a given entity that could produce the product identification device 12 and administer a dedicated website for the product network. Alternatively or additionally, product identification devices 12 could be installed by independent manufacturers, such as on initial product creation, or as aftermarket items for installation by consumers, distributors, or the like. As noted, the product identification device 12 can retain some or all details regarding the product 14 and the usage thereof in memory. Additionally or alternatively, some or all product details can be retained remotely for access via the Internet, by wireless communication, or some combination thereof or other communication protocol.

The applications disclosed herein can enable guidance as to, by way of example, desired and problematic ergonomic practices, exercises, and settings and information regarding the product 14 itself, such as its structure, function, and operation. Moreover, related selling and marketing services can be marketed to customers related to or even beyond the particular product 14 at hand.

Where the application is, for example, to be downloaded to the computing device 16 a user could first turn the computing device 16 on. Then, the application could be downloaded if it has not already been and actuated, such as by a computer command. For example, in a smart phone application, actuation of the application could be triggered by tapping on the application icon. The product identification device 12 can be rendered "discoverable" whether automatically or by some activation by the user, such as through an actuation button 42. The user's phone or other computing device 16 can then search to find information relating to the product 14. The application can provide other icons or selections, including Product Instructions, Product Maintenance, Product Features, Suggested Set Up & How to Use, Ergonomics, Biotechnology Advice, Habits, Use of Product, and Advice from doctors, ergonomists, manufacturers, and other information providers. The application can additionally link users to other products and services offered by the manufacturer or other entities in addition to products and services of other companies that might be useful to customers.

Once the computing device 16 discovers the product identification device 12 and the product 14, information and/or guidance regarding the same can be automatically or selectively provided, such as by download from the product identification device 12, the manufacturer, or some other provider. An identification of the product 16 could, for example, automatically appear on the screen, potentially with details and guidance and/or with the ability for further details and guidance to be selectively retrieved. Details regarding the structure, operation, and settings can be automatically provided, potentially based on particular user characteristics and preferences.

The application can also enable the input of personal data, whether by the user or by sensors associated with the product 14. The information and guidance could be provided via any suitable mechanism, whether a dedicated website, wireless transmission, or any other effective method. Personal data acquired could be time of use, tasks performed, work environment, age, height, weight, physical anomalies, and use, physical tendencies, and preferences. Suggested settings could be automatically determined and relayed to the user through the computing device 16 operating under the application. Suggested settings based on acquired data could be requested by the user and/or provided automatically. Still further, the application could guide a user in assembling a product 14, such as through a video, or in using the product 14, such as by reviewing the possible settings and other details of a product 14.

As noted previously, the application could automatically or selectively track product usage patterns via sensors on the product 14 and/or some other mechanism. For example, the application could have an icon that could trigger sensors on a product 14 to follow and track data from the usage pattern. The application could report to the user or a third party regarding sensed usage patterns, including, for example, how the usage pattern compared to suggested usage patterns. Where the application is employed relative to a chair 14 as disclosed herein, the application could track and display, by way of example, lumbar use, back pivoting resistance tension, mesh or elastomeric material tension, height, seat depth, and pivoting history.

Based on these and further measurements and information, the application can suggest adjusted settings, including additional adjustments to maximize the use of the product 14 for the consumer based on his or her characteristics, preferences, and patterns. Suggestions can be revised and repeated as necessary. Moreover, the application can suggest add-on devices, different types of products 14, or that the user talk to a person capable of providing particularized guidance, such as a doctor or ergonomist. The application could suggest exercises, heart healthy programs and products, and usage patterns for healthy and comfortable use of the product 14. The application can provide offers within one or more companies' product lines to offer related products and services.

Guidance and informational services can be provided to users of products 14 based on actual, user-specific data and otherwise. For example, if a customer purchases a furniture product, the manufacturer or other party can offer a "Heart Work Environment" Program with services based on actual data collected from customer employees. Personal heart programs can be targeted to employees of a company. The application can give advice on how to use the article of furniture in a better way to maximize user's health and well-being. Still further, where an article of furniture is not functioning properly, the application can suggest repair products and services. Where necessary, the application can provide remote guidance as to how to repair a product 14, including how to exchange broken or malfunctioning parts.

With certain details of the present invention for a product identification system and method disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A product identification and information system for use with a product, the product identification and information system comprising:
    a product wherein the product comprises a seat with a seat back and a seat bottom;
    a plurality of sensors for detecting usage of the seat wherein the plurality of sensors comprise seat back sensors, seat bottom sensors, and angular disposition sensors for sensing an angular disposition of the seat bottom;
    a product identification device for being retained relative to the product;
    means for retaining in electronic memory product identifying information regarding the product by the product identifying device;
    a computing device with a user interface;
    means for permitting electronic access to product details including the retained product identifying information through the user interface of the computing device;
    wherein the product details include generalized product details for all products of a given product type of the product and individualized product details comprising information specific to an individual product; and
    means for suggesting usage improvements through the user interface of the computing device based on the usage of the seat wherein the means for suggesting usage improvements comprises a means for automatically suggesting usage improvements in response to one or more sensed deficiencies in usage of the seat.

2. A product identification and information system for use with a product, the product identification and information system comprising:
    a product wherein the product comprises a furniture product;
    a plurality of sensors for detecting usage of the product wherein the plurality of sensors comprise localized force sensors retained by the furniture product;
    a product identification device for being retained relative to the product;
    electronic memory retained by the product wherein the electronic memory retains product identifying information regarding the product;
    means for permitting electronic access to product details including the retained product identifying information through a user interface of a computing device;
    wherein the product details include generalized product details for all products of a given product type of the product and individualized product details comprising information specific to an individual product; and
    means for suggesting usage improvements through the user interface of the computing device based on the usage of the furniture product wherein the means for suggesting usage improvements comprises a means for automatically suggesting usage improvements in response to one or more sensed deficiencies in usage of the furniture product.

3. The product identification and information system of claim 2 wherein the means for permitting electronic access to the retained identifying information permit access by wireless communication.

4. The product identification and information system of claim 2 wherein the means for permitting electronic access to the retained identifying information comprises a computing device in cooperation with a communication network.

5. The product identification and information system of claim 4 wherein the means for permitting electronic access to product details further comprises a central server with access to product identifying information.

6. The product identification and information system of claim 2 wherein the generalized product details include product characteristics, functions, construction, maintenance, performance, usage, warranty information, and instructions.

7. The product identification and information system of claim 6 wherein the individualized product details include date of purchase data.

8. The product identification and information system of claim 7 further comprising means for selectively inducing an electronic tracking of product usage.

9. The product identification and information system of claim 8 further comprising means for selectively inducing electronic analysis of product usage.

10. The product information communication system of claim 8 further comprising means for selectively accessing recommendations regarding product usage.

11. The product identification and information system of claim 10 wherein the recommendations regarding product usage are based on electronically tracked product usage.

12. The product identification and information system of claim 10 wherein the recommendations regarding product usage are based on personal data of a user wherein the personal data of the user is chosen from the group consisting of user age, height, weight, physical anomalies, and preferences.

13. The product identification and information system of claim 12 further comprising means for permitting an inputting of personal data of the user.

14. The product identification and information system 6 wherein there are basic product details automatically provided and further product details selectively accessible.

15. The product identification and information system of claim 2 wherein the product comprises a chair.

16. The product identification and information system of claim 2 wherein the product comprises a seat with a seat back and a seat bottom.

17. The product identification and information system of claim 16 wherein the plurality of sensors comprise seat back sensors, seat bottom sensors, and angular disposition sensors for sensing an angular disposition of the seat bottom.

\* \* \* \* \*